United States Patent [19]
Arnoldi

[11] Patent Number: 4,575,769
[45] Date of Patent: Mar. 11, 1986

[54] VARIABLE RESOLUTION SCANNING IN LINE SCAN OPTICAL IMAGING SYSTEMS

[75] Inventor: Douglas R. Arnoldi, Southbury, Conn.

[73] Assignee: Burroughs Corporation, Detroit, Mich.

[21] Appl. No.: 602,360

[22] Filed: Apr. 20, 1984

[51] Int. Cl.$^4$ .............................................. H04N 1/04
[52] U.S. Cl. .................................. 358/285; 358/293; 355/14 SH
[58] Field of Search ............... 358/293, 294, 288, 284, 358/285; 382/54; 355/14 SH; 271/266, 270

[56] References Cited

U.S. PATENT DOCUMENTS

| 4,217,611 | 8/1980 | Ogawa | 358/285 |
| 4,220,978 | 9/1980 | Rhyims et al. | 358/293 |
| 4,388,652 | 7/1983 | Dukes et al. | 358/293 |

FOREIGN PATENT DOCUMENTS

| 56-35756 | 9/1982 | Japan | 358/293 |
| 57-193170 | 11/1982 | Japan | 358/293 |

OTHER PUBLICATIONS

R. Perabo, "Technik der Fernkopierer", Machrichten Electronik, Heidelberg, vol. 35, No. 10, Oct. 1981, pp. 401-405.
K. Kobayashi et al., "High-Speed Digital Facsimile Equipment Development", Review of the Electrical Communication Laboratories, vol. 28, Nos. 1-2, Jan.-Feb. 1980, Tokyo, pp. 115-130.

*Primary Examiner*—Edward L. Coles, Sr.
*Attorney, Agent, or Firm*—Mark T. Starr; Kevin R. Peterson

[57] ABSTRACT

An improvement to a facsimile system which enables the simulation of 240 and 300 DPI feedwise scan resolutions in a system designed to operate at 200 and 400 DPI feedwise scan resolutions. The simulation is accomplished by feedwise advancing a document past a horizontal image scanner in defined sequences of half and full steps, half steps causing the document to be feedwise advanced by one four-hundredth of an inch (as in 400 DPI mode), full steps causing the document to be feedwise advanced by one two-hundredth of an inch (as in 200 DPI mode). The scan resolution errors introduced by the simulation are non-cumulative since the system comes back into feedwise synchronization with true 240 and 300 DPI scan resolutions each time one of the defined three operation sequences is completed. Also, a method of operating a document feeding system to approximate 240 and 300 DPI feedwise scan resolutions.

19 Claims, 3 Drawing Figures

Fig. 3

◄── DIRECTION OF DOCUMENT TRAVEL

FEEDWISE DISTANCE SCANNED/POSITION INCREMENT

POSITION NO. 0 1 2 3 4 5 6 7 8 9 10
400 DPI (TRUE)
⎵ ⎵
1/400 IN. 1/400 IN.

POSITION NO. 0 1 2 3 4 5
200 DPI (TRUE)
⎵_____⎵
1/200 IN.  1/200 IN.

POSITION NO. 0 1 2 3 4 5 6 7
300 DPI (TRUE)
⎵ ⎵
1/300 IN.  1/300 IN.

POSITION NO. 0 1 2 3* 4 5 6* 7
300 DPI (MODIFIED)
ERROR  ERROR  NO ERROR  ERROR  ERROR  NO ERROR  ERROR
1/400 IN.  1/200 IN.  1/400 IN.

POSITION NO. 0 1 2 3 4 5 6
240 DPI (TRUE)
⎵ ⎵
1/240 IN.  1/240 IN.

POSITION NO. 0 1 2 3* 4 5 6*
240 DPI (MODIFIED)
ERROR  ERROR  NO ERROR  ERROR  ERROR  NO ERROR
1/200 IN.  1/400 IN.  1/200 IN.

▲
HORRIZONTAL SCAN LINE

* COMES BACK INTO SYNC. WITH CORRESPONDING TRUE MODE

VARIABLE RESOLUTION SCANNING IN LINE SCAN OPTICAL IMAGING SYSTEMS

BACKGROUND OF THE INVENTION

The present invention relates in general to electro-optical document reading systems such as those used in facsimile equipment, optical character recognition, and image digitization. More particularly, the present invention relates to scanning or electronicly reading documents by utilizing a linear photosensor array and physically transporting a document past an optical system to achieve two dimensional viewing (or scanning). Still more particularly, the present invention relates to a method of operating a document feed subsystem which is part of an optical imaging system in order to achieve variable resolutions of feedwise scanning.

In many electro-optical document reading systems, light is directed onto a scanwise line of a document, and light is reflected from each elemental area of the line of the document in accordance with the color or blackness of the elemental area. The reflected light is fed through an optical system, usually including a spherical lens, to an electrical apparatus in which the reflected light is converted to electrical signals. In facsimile equipment these electrical signals are used to reproduce the document at a remote location. Typical of such an electrical apparatus is a photo-electric device, positioned behind the lens, which converts light reflected from each unit area of a scanwise line on the document to electrical signals. One suitable photo-electric device comprises an integrated circuit chip having a large number of tiny photosensitive elements arranged in a line, each element receiving light from a unit area of each scanwise line. In the discussion to follow, the direction perpendicular to the photo-electric device's linear axis will be termed "feedwise". The present invention relates to the control of scanning resolution in the "feedwise" (or "lengthwise") direction.

Systems characterized by the latter mentioned characteristics are well known in the prior art. For example, a facsimile system having the characteristics previously described is taught in U.S. Pat. No. 4,220,978, issued Sept. 2, 1980 for an Electro-Optical Document Reader.

In the field of facsimile telecommunications, most presently offered equipment is compatible with one of the international facsimile transmission procedures promulgated by the CCITT. The CCITT is the international body (Consultative Committee on International Telephone and Telegraph) that formulates compatibility standards particularly for communication between countries. The CCITT has developed standards for facsimile machines known as Group 1, Group 2 and Group 3, enabling machines of different manufacturers to communicate with each other. Group 1 machines conform to the first CCITT standard set in 1968. They communicate in six minutes per page and employ a technique called frequency modulation (FM). Group 2 machines conform to the CCITT Standard set in 1976 and are capable of three minutes per page transmission. These machines employ a technique called amplitude modulation (AM) which results in faster transfer of ihformation. Group 3 machines conform to the latest adopted CCITT Standard established in November, 1980. They employ digital techniques in which the information on the page is converted to digital data. This results in transmission speeds of less than one minute per page and improved image quality.

In the past, CCITT standards have specified different "scanwise" (or horizontal) and "feedwise" (or vertical) resolutions. Scanwise (or horizontal) resolutions have been defined in dots per line (or dots per inch (DPI)) while feedwise (or vertical) resolutions have been defined in lines per mm (or lines per inch (LPI)).

At the present time, a new standard (Group 4) is being considered for adoption by the CCITT. Allowable CCITT Group 4 resolutions are 200, 240, 300, and 400 DPI (dots per inch) in both the scanwise (or horizontal) and feedwise (or vertical) directions. Ideally, it is desirous to implement these multiple resolutions within one facsimile device at a minimum cost. In prior art facsimile systems, such as that previously described, the horizontal photo-electric device is in a fixed position and a mechanical means is utilized to feedwise (or vertically) transport the document past the photo-electric device. Typically, stepper motors with a precise number of magnetic detent positions per shaft revolution are used to feedwise transport the document in these devices. Counting drive pulses supplied to the motor gives an implied knowledge of the feedwise distance travelled by the document with the necessary precision. More expensive and complex position sensing and feedback controls are thereby avoided.

By selectively energizing stepper motor poles, rotor positioning in intermediate positions is possible. Half steps, using digital drivers to energize selected motor poles, can be achieved at a small sacrifice in torque. By utilizing half steps and full steps, those skilled in the art will appreciate that it is quite easy to achieve feedwise scan resolutions of 200 or 400 DPI. Thus, a system may readily be designed to feedwise transport the document by one two-hundredth of an inch per full motor step by suitable selection of roller diameters and drive ratios. By utilizing half step control of the stepper motor, feedwise document movement of one four-hundredth of an inch may be readily obtained. Of course, higher resolution optics and finer photo-electric devices should also be used to uniquely resolve the smaller picture elements (pixels) in the applications which include four hundred DPI feedwise resolution.

The intermediate resolutions of 240 and 300 DPI feedwise are not uniquely available from a 200/400 DPI drive. In the prior art, these intermediate resolutions were achieved by utilizing analog drivers. However, the circuit costs and power levels in systems utilizing such analog drivers rises rapidly. Another technique for achieving the intermediate resolutions of 240 and 300 DPI feedwise is to utilize a motor step causing the document to be transported by the lowest common denominator or one twelve-hundredth of an inch. Although a drive system could be designed to achieve a transport distance per step of one twelve-hundredth of an inch, stepper motor speed limitations would cause unacceptable through-put limitations.

It is a general object of the present invention to overcome the drawbacks of the prior art by providing a low cost system for feedwise transporting a document at one of the four Group 4 resolutions.

It is a further object of the present invention to use a stepper motor driven system to feedwise advance a document past a horizontal photo-electric device at feedwise resolutions corresponding to 200, 240, 300, or 400 DPI.

It is still another object of the present invention to provide a method of operating a stepper motor driven paper drive system which utilizes combinations of half motor steps and full motor steps in order to approximate any one of four feedwise scan rates including 200, 240, 300 and 400 DPI.

These and other objects and advantages of the present invention will become more apparent from the following detailed description of the preferred embodiment when read in conjunction with the drawings.

SUMMARY OF THE INVENTION

In accordance with the present invention, a stepper motor drive system is utilized to incrementally transport a document past a horizontal scan (or scanwise) line defined by the position of a CCD image sensor. The stepper motor drive system is designed to transport the document feedwise by one two-hundredth of an inch for each full step that the motor is rotated by. By utilizing half steps of the motor, feedwise scan resolutions of one four-hundredth of an inch are readily obtained. In order to achieve feedwise scan resolutions of 240 and 300 DPI, sequences of half motor steps and full motor steps are utilized to make a nearest approximation to the exact feedwise document positions for the intermediate resolutions. A pattern of motor steps in a first sequence $(1, \frac{1}{2}, 1, 1, \frac{1}{2}, 1, \ldots)$ and a pattern in a second sequence $(\frac{1}{2}, 1, \frac{1}{2}, \frac{1}{2}, 1, \frac{1}{2}, \ldots)$ provides simulated feedwise resolutions of 240 and 300 DPI, respectively. Since the individual document position errors are never more than one-fifth of a true pixel in the simulated 240 DPI mode and one-third of a true pixel in simulated 300 DPI mode, the simulation is quite good. Position errors are non-cumulative. Furthermore, because a 400 DPI size optical and image sensing system are used in order to satisfy 400 DPI requirements, the net performance of the simulation is superior to systems designed exclusively for 240 or 300 DPI resolution.

BRIEF DESCRIPTION OF THE DRAWINGS

FIG. 3 illustrates the non-cumulative errors introduced by utilizing combinations of half and full steps of a stepper motor in order to simulate all four resolutions available in a Group 4 facsimile system.

DETAILED DESCRIPTION OF THE PREFERRED EMBODIMENT

Figure 1:
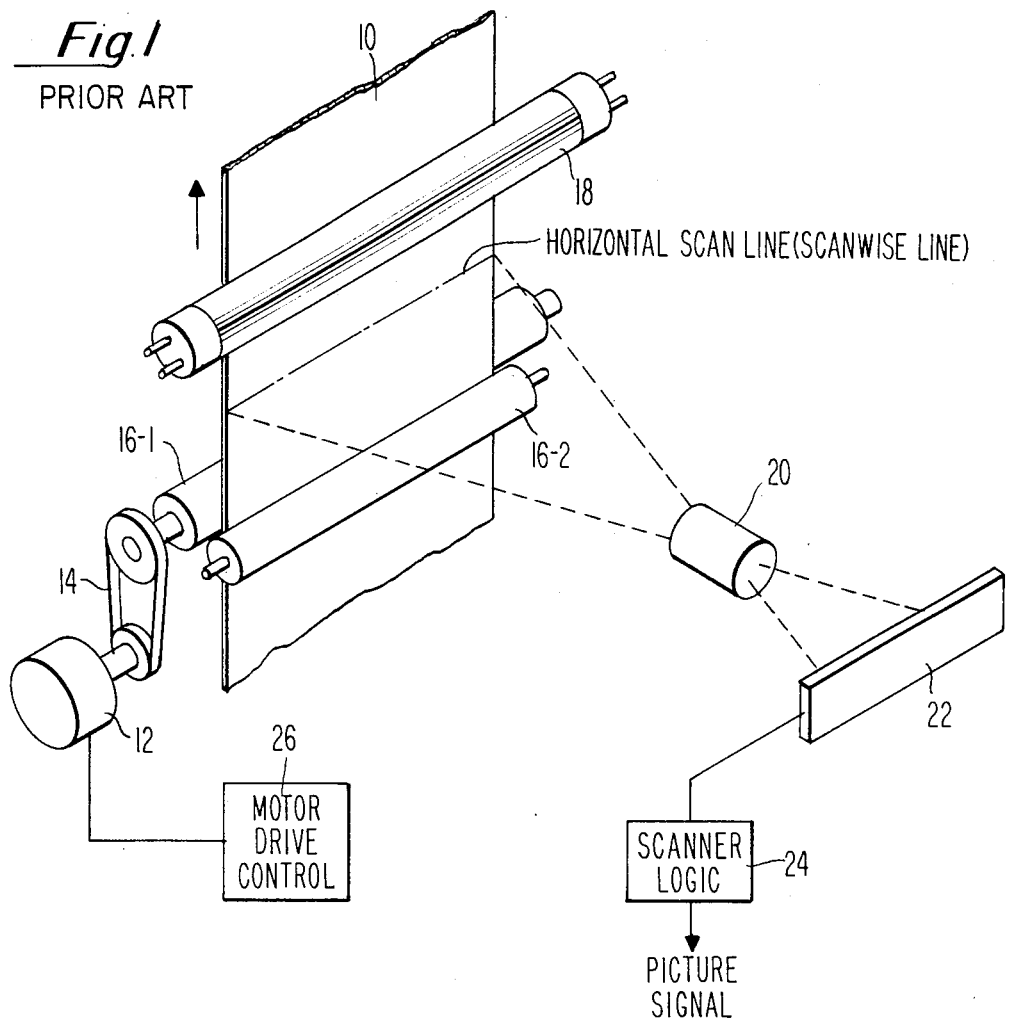
FIG. 1 shows a prior art electro-optical document reading device, wherein light is directed onto a line of a document and light is reflected from each elemental area of the line of the printed document and fed through an optical system to an electrical apparatus in which the reflected light is converted to electrical signals.

FIG. 1 illustrates a typical reading section of a prior art facsimile system. In such a system, a document 10 is incrementally transported in the vertical (or feedwise) direction shown by means of a stepper motor 12 which drives a driving mechanism 14, which in turn rotates feed roller 16-1 to advance document 10. The document 10 is illuminated by a fluorescent lamp 18 and light reflected off the document 10 scan (or scanwise) line is focused through the lens 20 onto a self-scanning charge coupled device (CCD) sensor 22. A typical CCD sensor 22 may include 2048 image sensors (not shown) which provide a horizontal resolution along the scanwise line of eight picture elements per millimeter.

Typically, the CCD (22) sensors read (integrate) during the whole time the document 10 is being transported through an incremental feedwise distance. The contents of the image sensors in the CCD sensor 22 are then shifted to a parallel storage register (not shown) included within the CCD sensor 22. The image sensors are then reset to zero and light integration starts again as the document is again feedwise transported by another increment. At the same time, the data in the parallel storage register is read serially by the scanner logic 24 (external to the CCD sensor 22).

Although the preferred embodiment of the invention operates in a facsimile system utilizing a CCD Sensor 22, those skilled in the art will appreciate that the invention will readily function in systems utilizing other types of optical and photo-electric conversion devices. For example, the invention is directly applicable for use in future imaging systems utilizing Selfoc lens arrays and "contact" scanners.

In the discussion to follow, the term "feedwise" refers to the direction that the document 10 is transported in. The term "scanwise" refers to the direction along the axis of the CCD sensor 22. In the preferred embodiment of the invention, the document 10 is transported in a vertical direction. Hence, in the case of the preferred embodiment, the term "feedwise" refers to the document 10 being transported vertically past the CCD sensor 22. However, those skilled in the art will appreciate that variations to the preferred embodiment may provide for transporting the document 10 in other than the vertical direction. Therefore, the term "feedwise" should not be construed as being limited to the vertical direction.

In a system designed only to read at a feedwise scan resolution of one two-hundredth of an inch (200 DPI), the stepper motor 12 output shaft would always rotate by a fixed number of degrees to cause the document 10 to be feedwise advanced by one two-hundredth of an inch for each full motor 12 step. If the system additionally included the capability to accomplish a feedwise scanning resolution of one four-hundredth of an inch (400 DPI), half motor 12 steps would be utilized in order to rotate the motor 12 output shaft by half of the number of degrees and thereby feedwise advance the document 10 by one four-hundredth of an inch for each half motor 12 step.

Figure 2:
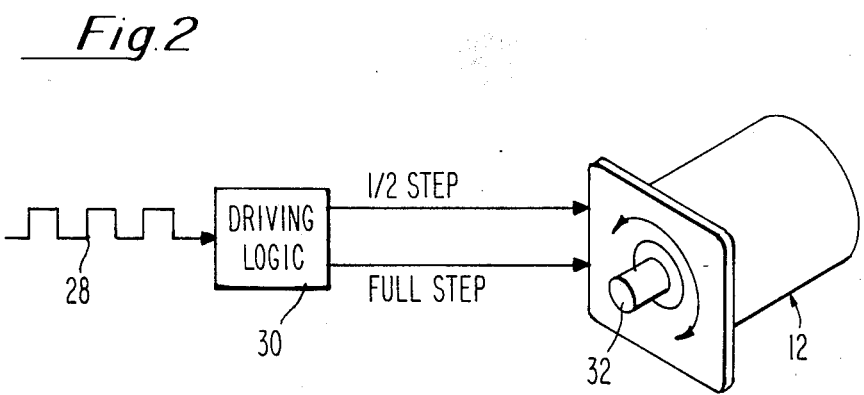
FIG. 2 illustrates in block diagram form the conversion of digital pulses to analog shaft rotation as accomplished by a typical stepper motor.

Referring next to FIG. 2, the operation of a typical stepper motor 12 will be briefly explained. A stepper motor 12 is an electro-magnetic, rotary, incremental actuator which mechanically converts digital pulse inputs 28 to incremental shaft 32 rotation. This rotation not only has a direct relation to the number of input pulses 28, but its (average) speed is related to the frequencies of the pulses 28. The driving logic 30 controls the application of power to the four poles (not shown) in the stepper motor 12. Those skilled in the art will appreciate that by using appropriate combinations of power application to the motor 12 poles, the stepper motor 12 can be made to increment by full or half steps in either a clockwise or counterclockwise direction, half motor 12 steps causing half the amount of shaft 32 rotation as full motor 12 steps.

Stepper motors 12 with 200 precise magnetic detent positions per shaft revolution are commonly used to transport documents 10 in facsimile devices. By counting drive pulses supplied to the motor 12, an implied knowledge of the feedwise distance travelled by the document 10 is obtained. In the preferred embodiment of the present invention, the motor drive control 26 (FIG. 1) is capable of effecting a full step of the stepper motor 12 and the driving mechanism 14 translates this full step into a one two-hundredth of an inch feedwise advancement of document 10. Additionally, the motor drive control 26 can cause the stepper motor 12 to increment by one half step, the half step resulting in the document 10 being feedwise transported by one four-hundredth of an inch. The design of the drive control 26 logic necessary to actuate the stepper motor 12 in this manner and further the design of the driving mechanism 14 between the stepper motor 12 and the drive roller(s) 16, will be obvious to those of ordinary skill in the art. Further, those skilled in the art will appreciate that in response to a user supplied input selecting either 200 or 400 DPI resolution, the motor drive control 26 will supply appropriate signals to the stepper motor 12 to cause the paper to be advanced feedwise in increments of one two-hundredth of an inch or one four-hundredth of an inch, respectively.

When operating at either the 200 DPI or 400 DPI feedwise scan resolutions, the motor 12 drive pulse frequency supplied by the motor drive control 26 and the CCD sensor 22 clock frequency remain unchanged. Therefore, the throughput rate at 200 DPI resolution is twice that at 400 DPI resolution, since the full motor step in 200 DPI mode transports the document 10 by twice the distance than the half motor step in 400 DPI mode. This consequence does not occur in prior art systems utilizing a single step size (1/400 inch) and disgarding alternate scanned lines when operating at 200 DPI feedwise resolution.

As previously mentioned, the present invention additionally provides feedwise resolutions approximating the 240 and 300 DPI rates by utilizing combinations of full motor 12 steps and half motor 12 steps.

Referring now to FIG. 3, the method of operating the stepper motor 12 in order to approximate the 240 and 300 DPI feedwise scan resolutions will be explained. In FIG. 3, the horizontal scan line identifies the scanwise line from which light reflected off the document 10 is focused through the lens 20 and onto the horizontal axis of the CCD sensor 22. In the description to follow, a reference to a document 10 position number means that the document 10 is feedwise positioned with that document position number adjacent to the horizontal scan (or scanwise) line. In all cases, the document 10 is initially feedwise positioned with document 10 position number 0 adjacent to the horizontal scan line. Position numbers on the document 10 vary in accordance with the feedwise scan resolution. When it is stated that the document 10 is feedwise advanced (or transported) from position 0 to position 1, it means that the document 10 is transported feedwise from the point where document 10 position 0 is in line with the horizontal scan line to the point where document position 1 is in line with the horizontal scan line. Since the distance between each document 10 position number varies depending on the feedwise scan resolution, the distance the document 10 is moved in transporting the document 10 from position 0 to position 1 may differ depending on the feedwise scan resolution.

When the system operates at a 400 DPI feedwise scan resolution, the motor drive control 26 causes the stepper motor 12 to increment by half steps. The first half motor 12 step results in the document 10 being feedwise transported in the direction shown from position number 0 to position number 1 (as shown on the 400 DPI (true) line in FIG. 3), the distance the document 10 is transported being one four-hundredth of an inch. The CCD sensor 22 integrates (or reads) during the whole time the document 10 is being transported from position 0 to position 1. After the document 10 reaches position 1, the contents of the sensor 22 are read by the scanner logic 24 and the system is again activated to cause the document 10 to again be transported by one four-hundredth of an inch due to the motor drive control 26 signalling the motor 12 to again rotate by one half step. In 400 DPI scan resolution, the motor drive control 26 always causes the motor 12 to increment by half steps.

When the user specifies a 200 DPI feedwise scan resolution, the motor 12 is continually incremented by full steps, thereby resulting in the feedwise advancement of the document 10 by increments of one two-hundredth of an inch. In a similar fashion to that in 400 DPI resolution, reading occurs during the time when the document 10 is moving from position 0 to position 1 (as shown in the 200 DPI (true) line in FIG. 3), the distance scanned being one two-hundredth of an inch. For 200 DPI scan resolution, the motor 12 is always incremented in full steps, thereby always causing the document 10 to be feedwise transported in increments of one two-hundredth of an inch.

The present invention does not include the capability of an exact 300 DPI feedwise scan resolution. However, as shown by the 300 DPI (true) line in FIG. 3, if it did the document 10 would be feedwise advanced by one three-hundredth of an inch for each activation of drive motor 12. As in the case of 200 and 400 DPI feedwise scan resolutions, reading would occur during each time the document 10 is tranported from one position being in line with the horizontal scan line until the next document 10 position is in line with the horizontal scan line, the document 10 always being transported by the same distance.

In order to approximate a 300 DPI feedwise scan resolution, in the present invention the motor drive control 26 increments the step motor 12 by a sequence of ½, 1, ½, ½, 1, ½, . . . step. This is illustrated in FIG. 3 by the 300 DPI (modified) line. Thus, the step motor 12 is first sequenced by one half of a step to transport the document 10 by one four-hundredth of an inch from position 0 to position 1. As in the other scan resolutions, reading occurs during the movement of the document 10 past the horizontal scan line. Next, the motor drive control 26 signals the stepper motor 12 to advance by one full step, thereby causing the document 10 to be feedwise transported by one two-hundredth of an inch to position number 2. Again, the image sensor 22 integrates the light received during the time that the document 10 is being feedwise transported past the horizontal scan line. Next, the motor drive control 26 signals the stepper motor 12 to rotate by one half step, thereby causing the document 10 to be feedwise advanced by one four-hundredth of an inch to position 3. Again, reading occurs during the time that the document 10 is being feedwise transported from position number 2 to position number 3. Thereafter, the latter described sequence of a half motor 12 step, a full motor 12 step, and a half motor 12 step is repeated so long as reading is to occur in the three 300 modified DPI mode.

As may be seen in FIG. 3, the feedwise distance scanned in 300 modified DPI mode in moving the document 10 from position 0 to position 1 is less than the distance that would have been scanned if a true 300 DPI feedwise scan resolution was implemented. The distance scanned in moving the document 10 from 300 modified position 1 to 300 modified position 2 is greater than the distance that would have been scanned had the system operated in a true 300 DPI scan resolution. Similarly, the distance scanned in moving the document 10 from 300 modified position 2 to 300 modified position 3 is again less than the distance that would have been scanned if a true 300 DPI scan resolution was implemented. The differences between the feedwise distances scanned in 300 DPI modified mode and 300 (true) DPI resolution are indicated in FIG. 3 as "errors". Since at the end of the 300 modified DPI sequence (position number 3) the document 10 is positioned at the same position it would have been at had a true 300 DPI scan resolution been used, these errors are non-cumulative. That is, the errors do not continue to be propagated as reading occurs when incrementally advancing the document 10 from position 3 to position 7. In other words, since the 300 modified DPI mode comes back into phase at the end of three position advances, the previous errors do not influence future accuracy in repeated cycles. As previously mentioned, because the individual position errors in the 300 modified DPI mode are never more than one/third of a true pixel, the simulation is remarkably good. Position errors are non-cumulative. Furthermore, because a 400 DPI size optical 20 and photosensing 22 system are used in order to satisfy 400 DPI requirements, the net performance of the simulation is superior to the systems designed exclusively for true 300 DPI feedwise scan resolution. Those skilled in the art will appreciate that the reason why the resolution in 300 modified DPI mode is superior is due to the increased modulation inherently provided to satisfy 400 DPI requirements as compared to that obtained by using a true 300 DPI feedwise scan resolution.

In a situation where a transmitter as shown in FIG. 1 operates in the 300 modified DPI feedwise resolution mode and a receiver operates at true 300 DPI feedwise resolution (that is, in a mixed system), the maximum error by which a line may be feedwise in error is less than one one-thousandth of an inch. Such an error, which is non-cumulative, is quite acceptable considering the reduced cost of implementing the 300 DPI modified feedwise scan resolution. It can be shown that in a non-mixed 300 modified DPI feedwise scan resolution system operating in a reading-while-moving mode and assuming perfect optics, that the minimum modulation is 51.8% and the average modulation is 58.7%. This is contrasted to the 50% modulation obtained with a dedicated system operating at a true 300 DPI feedwise scan resolution.

FIG. 3 additionally illustrates the operation of the system in a 240 modified DPI mode as contrasted to a 240 DPI true feedwise scan resolution. In a true 240 DPI scan resolution, the document 10 is feedwise transported by one 240th of an inch for each step (or part step) of the drive motor 12. Scanning occurs over each one 240th of an inch feedwise increment of the document 10, the size of the feedwise distance scanned always being constant at one 240th of an inch. This is shown in the DPI (true) line of FIG. 3 by the incrementing of the document 10 from position 0 to position 5. In order to utilize the half step/full step capability of the system of FIG. 1 to simulate a 240 DPI feedwise scan resolution, the motor drive control 26 functions to advance the motor 12 by a sequence of 1, ½, 1, 1, ½, 1, . . step. Still referring to FIG. 3, the 240 modified DPI line shows that the document 10 in moving from position 0 to position 1 is advanced by one two-hundredth of an inch in response to a full motor 12 step. As indicated by the error, the distance scanned on the first increment of one two-hundredth of an inch is greater than the distance that would have been scanned if a true 240 DPI feedwise scan resolution was provided by the system. In moving from position number 1 to position number 2 in 240 modified mode, the document 10 is feedwise advanced by one four-hundredth of an inch due to the motor drive control 26 causing the step motor 12 to rotate by one half of a step, the distance scanned (one four-hundredth of an inch) being less than the one 240th of an inch that would have been scanned had a true 240 DPI feedwise scan rate been implemented in the system. In moving the document 10 from position 2 to position 3 in the 240 modified DPI mode, the document 10 is advanced by one two-hundredth of an inch due to the motor drive control 26 signalling the stepper motor 12 to advance by one full step. As in the case of 300 DPI modified mode, at the end of the third increment in 240 modified DPI mode, the document's feedwise position (number 3) is back in sync with the position that it would have been at had the system provided a true 240 DPI feedwise scan resolution. As in the case of 300 DPI modified resolution, the errors introduced are non-cumulative. The sequence of a full motor 12 step, a half motor 12 step, and a full motor 12 step is repeated as the document 10 is moved from position 3 to position 6 and thereafter as the remainder of the document 10 is scanned in 240 modified DPI mode.

Because the individual position errors are never more than one fifth of a true pixel in 240 modified DPI mode, the simulation is remarkably good. Position errors are non-cumulative. Furthermore, because a 400 DPI size optical 20 and photosensing 22 system are used in order to satisfy 400 DPI scan resolution requirements, the net performance of the simulation is superior to systems designed exclusively for a true 240 DPI feedwise resolution. As in the case of 300 modified DPI mode, the error introduced in utilizing a mixture of an actual 240 DPI transmitter and a modified 240 DPI receiver, or vice versa, may result in a line being feedwise in error by up to one one-thousandth of an inch.

It can be shown that by utilizing a transmitter and receiver operating in 240 modified DPI mode, that the minimum modulation obtained is 59.2% and the average modulation is 66.1%. Such modulation is better than the 50% average modulation obtained with a true 240 DPI dedicated system operated in a read-while-transporting mode.

Having shown and described the preferred embodiment of the present invention, those skilled in the art will realize that various omissions, substitutions and changes in forms and details may be made without departing from the spirit of the invention. Thus, for example, the document scanned may take the form of a length of paper, a web, a film, or other type of medium. Additionally, those skilled in the art will appreciate that the present invention may be utilized for scanning in either the scanwise or feedwise direction, or in both directions. Still further, those skilled in the art will appreciate that the present invention is not limited to use in facsimile equipment, but may be easily incorporated in other electro-optical systems including those employed for optical character recognition and image digitization. It is the intention, therefore, for the invention to be limited only as indicated by the scope of the following claims.

What is claimed is:

1. A method of operating a document feeding system to approximate a 240 DPI feedwise scan resolution, said system including means for feedwise advancing said document by either one four-hundredth of an inch or one two-hundredth of an inch, said method comprising the steps of:
   a—advancing said document by said one two-hundredth of an inch;
   b—advancing said document by said one four-hundredth of an inch;
   c—advancing said document by said one two-hundredth of an inch; and
   d—repeating said steps a–c.

2. The method in accordance with claim 1 further including the step of scanning a scanwise section of said document while said document is being feedwise advanced.

3. The method in accordance with claim 1 wherein said system includes driving means for feedwise advancing said document, said driving means operable in full steps or half steps, one of said full steps causing said document to be feedwise advanced by said one two-hundredth of an inch, one of said half steps causing said document to be feedwise advanced by said one four-hundredth of an inch, said steps a and c accomplished by operating said driving means for one of said full steps, said step b accomplished by operating said driving means for one of said half steps.

4. The method in accordance with claim 3 wherein said driving means includes a stepper motor, the rotation of said stepper motor causing said document to be feedwise advanced in direct relation to the degrees of stepper motor rotation, said stepper motor rotated by a fixed number of degrees for each of said full steps, said stepper motor rotated by half of said fixed number of degrees for each of said half steps.

5. A method of operating a document feeding system to approximate a 300 DPI feedwise scan resolution, said system including means for feedwise advancing said document by either one four-hundredth of an inch or one two-hundredth of an inch, said method comprising the steps of:
   a—advancing said document by said one four-hundredth of an inch;
   b—advancing said document by said one two-hundredth of an inch;
   c—advancing said document by said one four-hundredth of an inch; and
   d—repeating said steps a–c.

6. The method in accordance with claim 5 further including the step of scanning a scanwise section of said document while said document is being feedwise advanced.

7. The method in accordance with claim 5 wherein said system includes driving means for feedwise advancing said document, said driving means operable in full steps or half steps, one of said full steps causing said document to be feedwise advanced by said one two-hundredth of an inch, one of said half steps causing said document to be feedwise advanced by said one four-hundredth of an inch, said step b accomplished by operating said driving means for one of said full steps, said steps a and c accomplished by operating said driving means for one of said half steps.

8. The method in accordance with claim 7 wherein said driving means includes a stepper motor, the rotation of said stepper motor causing said document to be feedwise advanced in direct relation to the degrees of stepper motor rotation, said stepper motor rotated by a fixed number of degrees for each of said full steps, said stepper motor rotated by half of said fixed number of degrees for each of said half steps.

9. A system including illuminating means for illuminating a document, lens means for focusing light reflected from a scanwise line onto a scanner means, and means for feedwise advancing said document in increments of one four-hundredth of an inch or one two hundredth of an inch, said scanner means for reading said focused reflected light while said document is being feedwise advanced, wherein the improvement comprises:
   control means, connected to said feedwise advancing means, for causing said document to be feedwise advanced past said scanwise line in a first sequence of steps of one two-hundredth of an inch, one four-hundredth of an inch, and one two-hundredth of an inch, whereby a 240 DPI feedwise scanning resolution is approximated.

10. The facsimile system in accordance with claim 9 wherein said control means further includes means for repeating said first sequence so long as said document is to be scanned at said approximate 240 DPI feedwise scanning resolution.

11. The system in accordance with claim 9 wherein said control means further includes means for causing said document to be feedwise advanced in a second sequence of steps of one four-hundredth of an inch, one two-hundredth of an inch, and one four-hundredth of an inch, whereby a 300 DPI feedwise scanning resolution is approximated.

12. The system in accordance with claim 9 wherein said feedwise advance means includes:
   a stepper motor; and
   drive means, responsive to the output of said stepper motor, for feedwise advancing said document in direct proportion to the rotation of said stepper motor.

13. The system in accordance with claim 12 wherein said stepper motor, in response to said control means, will rotate by a full motor step or a half motor step, said full motor step corresponding to the rotation of said stepper motor by a fixed number of degrees, said half motor step corresponding to rotation of said stepper motor by half of said fixed number of degrees, said full motor step causing said drive means to feedwise advance said document by one two-hundredth of an inch, said half motor step causing said drive means to feedwise advance said document by one four-hundredth of an inch.

14. A system including illuminating means for illuminating a document, lens means for focusing light reflected from a scanwise line onto a scanner means, and means for feedwise advancing said document in increments of one four-hundredth of an inch or one two hundredth of an inch, said scanner means for reading said focused reflected light while said document is being feedwise advanced, wherein the improvement comprises:
   control means connected to said feedwise advancing means, for causing said document to be feedwise advanced past said scanwise line in a first sequence of steps of one four-hundredth of an inch, one two-hundredth of an inch, and one four-hundredth of an inch, whereby a 300 DPI feedwise scanning resolution is approximated.

15. The system in accordance with claim 14 wherein said control means further includes means for repeating said first sequence so long as said document is to be scanned at said approximate 300 DPI feedwise scanning resolution.

16. The system in accordance with claim 14 wherein said control means further includes means for causing said document to be feedwise advanced in a second sequence of steps of one two-hundredth of an inch, one four-hundredth of an inch, and one two-hundredth of an inch, whereby a 240 DPI feedwise scanning resolution is approximated.

17. The system in accordance with claim 14 wherein said feedwise advance means includes:
- a stepper motor; and
- drive means, responsive to the output of said stepper motor, for feedwise advancing said document in direct proportion to the rotation of said stepper motor.

18. The system in accordance with claim 17 wherein said stepper motor, in response to said control means, will rotate by a full motor step or a half motor step, said full motor step corresponding to the rotation of said stepper motor by a fixed number of degrees, said half motor step corresponding to rotation of said stepper motor by half of said fixed number of degrees, said full motor step causing said drive means to feedwise advance said document by one two-hundredth of an inch, said half motor step causing said drive means to feedwise advance said document by one four-hundredth of an inch.

19. The facsimile system in accordance with claim 14 wherein said focusing means and said scanner means are capable of resolving a 400 feedwise DPI scan resolution.

* * * * *